(12) United States Patent
Shiao et al.

(10) Patent No.: US 10,246,879 B2
(45) Date of Patent: Apr. 2, 2019

(54) ROOFING GRANULES WITH HIGH SOLAR REFLECTANCE, ROOFING PRODUCTS WITH HIGH SOLAR REFLECTANCE, AND PROCESSES FOR PRODUCING SAME

(71) Applicant: CertainTeed Corporation, Malvern, PA (US)

(72) Inventors: Ming Liang Shiao, Collegeville, PA (US); Keith C. Hong, Lititz, PA (US); Walter T. Stephens, Cleveland, OH (US)

(73) Assignee: CertainTeed Corporation, Malvern, PA (US)

( * ) Notice: Subject to any disclaimer, the term of this patent is extended or adjusted under 35 U.S.C. 154(b) by 103 days.

(21) Appl. No.: 15/211,085

(22) Filed: Jul. 15, 2016

(65) Prior Publication Data

US 2016/0326746 A1 Nov. 10, 2016

Related U.S. Application Data

(62) Division of application No. 12/601,169, filed as application No. PCT/US2008/064676 on May 23, 2008, now abandoned.

(Continued)

(51) Int. Cl.
*B05D 7/00* (2006.01)
*E04D 1/00* (2006.01)
(Continued)

(52) U.S. Cl.
CPC ............. *E04D 1/12* (2013.01); *C04B 18/021* (2013.01); *C04B 33/04* (2013.01); *C04B 33/14* (2013.01); *C04B 35/62695* (2013.01); *C04B 35/62821* (2013.01); *C04B 35/636* (2013.01); *C04B 35/6316* (2013.01); *C04B 35/6365* (2013.01); *C04B 35/64* (2013.01); *E04D 5/12* (2013.01); *E04D 7/005* (2013.01); *C04B 2111/00586* (2013.01); *C04B 2111/80* (2013.01);
(Continued)

(58) Field of Classification Search
USPC ............ 427/186, 189, 215, 218, 220, 372.2, 427/397.7, 397.8
See application file for complete search history.

(56) References Cited

U.S. PATENT DOCUMENTS 2,379,358 A 6/1945 Jewett
2,591,149 A 4/1952 Grove
(Continued)

FOREIGN PATENT DOCUMENTS

EP 0003302 A 8/1997
GB 1214816 A 2/1970
(Continued)

OTHER PUBLICATIONS

Adobe Systems Inc., Technical Guides "Color Models, CIELAB" 2 pgs., 2000.
(Continued)

*Primary Examiner* — Hoa (Holly) Le
(74) *Attorney, Agent, or Firm* — McDonnell Boehnen Hulbert & Berghoff LLP

(57) ABSTRACT

Solar reflective roofing granules include a binder and inert mineral particles, with solar reflective particles dispersed in the binder. An agglomeration process preferentially disposes the solar reflective particles at a desired depth within or beneath the surface of the granules.

13 Claims, 2 Drawing Sheets

Related U.S. Application Data

(60) Provisional application No. 60/939,989, filed on May 24, 2007.

(51) Int. Cl.

| | | |
|---|---|---|
| *E04D 1/12* | (2006.01) | |
| *C04B 18/02* | (2006.01) | |
| *C04B 33/04* | (2006.01) | |
| *C04B 33/14* | (2006.01) | |
| *C04B 35/626* | (2006.01) | |
| *C04B 35/628* | (2006.01) | |
| *C04B 35/63* | (2006.01) | |
| *C04B 35/636* | (2006.01) | |
| *E04D 7/00* | (2006.01) | |
| *C04B 35/64* | (2006.01) | |
| *E04D 5/12* | (2006.01) | |
| *C04B 111/00* | (2006.01) | |
| *C04B 111/80* | (2006.01) | |

(52) U.S. Cl.
CPC .......... *C04B 2235/3232* (2013.01); *C04B 2235/349* (2013.01); *C04B 2235/3427* (2013.01); *C04B 2235/48* (2013.01); *C04B 2235/656* (2013.01); *C04B 2235/9646* (2013.01); *E04D 2001/005* (2013.01); *Y02A 30/255* (2018.01); *Y02B 80/34* (2013.01); *Y10T 428/2982* (2015.01); *Y10T 428/2993* (2015.01)

(56) References Cited

U.S. PATENT DOCUMENTS

| | | | |
|---|---|---|---|
| 2,614,051 | A | 10/1952 | Buzzell et al. |
| 2,732,311 | A | 1/1956 | Hartwright |
| 2,898,232 | A | 8/1959 | Miller et al. |
| 2,927,045 | A | 3/1960 | Lodge et al. |
| 2,963,378 | A | 12/1960 | Palmquist et al. |
| 2,981,636 | A | 4/1961 | Lodge et al. |
| 3,255,031 | A | 6/1966 | Lodge et al. |
| 3,507,676 | A | 4/1970 | McMahon |
| 4,038,239 | A | 7/1977 | Coyner et al. |
| 4,092,441 | A | 5/1978 | Meyer et al. |
| 4,218,502 | A | 8/1980 | Graham et al. |
| 4,287,248 | A | 9/1981 | Gessner et al. |
| 4,378,408 | A | 3/1983 | Joedicke |
| 4,583,486 | A | 4/1986 | Miller |
| 4,708,812 | A | 11/1987 | Haffeld |
| 4,717,614 | A | 1/1988 | Bondoc et al. |
| 4,916,014 | A | 4/1990 | Weber et al. |
| 5,000,999 | A | 3/1991 | Hollander |
| 5,194,113 | A | 3/1993 | Lasch et al. |
| 5,240,760 | A | 8/1993 | George et al. |
| 5,310,803 | A | 5/1994 | Hansen |
| 5,356,664 | A | 10/1994 | Narayan et al. |
| 5,380,552 | A | 1/1995 | George et al. |
| 5,411,803 | A | 5/1995 | George et al. |
| 5,427,793 | A | 6/1995 | Bigham et al. |
| 5,456,785 | A | 10/1995 | Venable |
| 5,484,477 | A | 1/1996 | George et al. |
| 5,514,350 | A | 5/1996 | Kear et al. |
| 5,516,573 | A | 5/1996 | George et al. |
| 5,541,350 | A | 7/1996 | Murata et al. |
| 5,571,596 | A | 11/1996 | Johnson |
| 5,573,782 | A | 11/1996 | Bigham et al. |
| 5,595,813 | A | 1/1997 | Ogawa et al. |
| 5,620,554 | A | 4/1997 | Venable |
| 5,643,399 | A | 7/1997 | Venable |
| 5,723,516 | A | 3/1998 | Bigham et al. |
| 5,731,369 | A | 3/1998 | Mahoney |
| 5,770,295 | A | 6/1998 | Alderman |
| 5,783,506 | A | 7/1998 | Eppler et al. |
| 5,795,389 | A | 8/1998 | Koschitzky |
| 5,840,111 | A | 11/1998 | Wiederhoft et al. |
| 5,876,683 | A | 3/1999 | Glumac et al. |
| 5,928,761 | A | 7/1999 | Hedblom et al. |
| 5,962,143 | A | 10/1999 | Krauthauser et al. |
| 6,037,289 | A | 3/2000 | Chopin et al. |
| 6,063,312 | A | 5/2000 | Mannheimer |
| 6,124,466 | A | 9/2000 | Matsuno et al. |
| 6,143,318 | A | 11/2000 | Gilchrist et al. |
| 6,156,245 | A | 12/2000 | Takebayashi et al. |
| 6,174,360 | B1 | 1/2001 | Sliwinski et al. |
| 6,214,466 | B1 | 4/2001 | Joedicke |
| 6,217,252 | B1 | 4/2001 | Tolliver et al. |
| 6,245,381 | B1 | 6/2001 | Israel |
| 6,245,850 | B1 | 6/2001 | Fields |
| 6,296,912 | B1 | 10/2001 | Zickell |
| 6,355,309 | B1 | 3/2002 | Fleming et al. |
| 6,362,121 | B1 | 3/2002 | Chopin et al. |
| 6,366,397 | B1 | 4/2002 | Genjima et al. |
| 6,376,075 | B1 | 4/2002 | Tacke-Willemsen et al. |
| 6,426,309 | B1 | 7/2002 | Miller et al. |
| 6,446,402 | B1 | 9/2002 | Byker et al. |
| 6,451,874 | B1 | 9/2002 | Purgett et al. |
| 6,454,848 | B2 | 9/2002 | Sliwinski et al. |
| 6,465,088 | B1 | 10/2002 | Talpaert et al. |
| 6,500,555 | B1 | 12/2002 | Khaldi |
| 6,502,360 | B2 | 1/2003 | Carr, III et al. |
| 6,521,038 | B2 | 2/2003 | Yanagimoto et al. |
| 6,531,200 | B2 | 3/2003 | Zickell et al. |
| 6,533,961 | B2 | 3/2003 | Harelstad et al. |
| 6,537,703 | B2 | 3/2003 | DuPasquier et al. |
| 6,548,145 | B2 | 4/2003 | Joedicke |
| 6,569,520 | B1 | 5/2003 | Jacobs |
| 6,572,748 | B1 | 6/2003 | Coombs et al. |
| 6,596,070 | B1 | 7/2003 | Schmidt et al. |
| 6,599,355 | B1 | 7/2003 | Schmidt et al. |
| 6,607,781 | B2 | 8/2003 | Joedicke |
| 6,610,135 | B1 | 8/2003 | Ohmori et al. |
| 6,610,147 | B2 | 8/2003 | Aschenbeck |
| 6,647,688 | B1 | 11/2003 | Gaitan et al. |
| 6,653,356 | B2 | 11/2003 | Sherman |
| 6,680,134 | B2 | 1/2004 | Maurer et al. |
| 6,692,824 | B2 | 2/2004 | Benz et al. |
| 6,703,127 | B2 | 3/2004 | Davis et al. |
| 6,797,277 | B2 | 9/2004 | Heier et al. |
| 6,861,145 | B2 | 3/2005 | Nastke et al. |
| 6,881,702 | B2 | 4/2005 | Arnold et al. |
| 6,905,698 | B1 | 6/2005 | Aldcroft et al. |
| 6,933,007 | B2 | 8/2005 | Fensel et al. |
| 7,132,143 | B2 | 11/2006 | Zanchetta et al. |
| 7,176,245 | B2 | 2/2007 | Stucky et al. |
| 7,238,408 | B2 | 7/2007 | Aschenbeck et al. |
| 2002/0092596 | A1 | 7/2002 | Phillips et al. |
| 2002/0160151 | A1 | 10/2002 | Pinault et al. |
| 2003/0035972 | A1 | 2/2003 | Hanson et al. |
| 2003/0044525 | A1 | 3/2003 | Aschenbeck |
| 2003/0068469 | A1 | 4/2003 | Aschenbeck et al. |
| 2003/0091795 | A1 | 5/2003 | Kiik et al. |
| 2003/0091814 | A1 | 5/2003 | Benz et al. |
| 2003/0152747 | A1 | 8/2003 | Fensel et al. |
| 2003/0203145 | A1 | 10/2003 | Zanchetta et al. |
| 2003/0219563 | A1 | 11/2003 | Zanchetta et al. |
| 2004/0076826 | A1 | 4/2004 | Lee |
| 2004/0110639 | A1 | 6/2004 | Joedicke |
| 2004/0170806 | A1 | 9/2004 | Hittle et al. |
| 2004/0255548 | A1 | 12/2004 | Hong et al. |
| 2004/0258835 | A1 | 12/2004 | Hong et al. |
| 2005/0053745 | A1 | 3/2005 | Bartek et al. |
| 2005/0053746 | A1 | 3/2005 | Bartek |
| 2005/0064175 | A1 | 3/2005 | Azari et al. |
| 2005/0072110 | A1 | 4/2005 | Shiao et al. |
| 2005/0072114 | A1 | 4/2005 | Shiao et al. |
| 2006/0110996 | A1 | 5/2006 | Getlichermann |
| 2006/0243388 | A1 | 6/2006 | Kubiak et al. |
| 2006/0251807 | A1 | 11/2006 | Hong et al. |

FOREIGN PATENT DOCUMENTS

| | | |
|---|---|---|
| JP | 61176501 A | 8/1986 |
| JP | 2004162482 | 6/2004 |

(56) References Cited

FOREIGN PATENT DOCUMENTS

WO 9423580 A 10/1994
WO 0011949 A 3/2000

OTHER PUBLICATIONS

Adobe Systems Inc., Technical Guides "Color Models, The CIE Color Models," 2 pgs., 2000.
Adobe Systems Inc., Technical Guides "Color Models, CIEXYZ," 2 pgs., 2000.
Adobe Systems Inc., Technical Guides "Color Models, The Munsell Color System," 4 pgs., 2000.
BASF Aktiengesellschaft, "Product Specification, SIXOLUX Metal Gloss L 6015," 1 pg., Sep. 18, 2002.
BASF Akitengessellschaft, "Product Specification, SIXOLUX Copper Gloss L 3015," 1 pg., Sep. 18, 2002.
BASF Corporation, "BASF launches two new pigments for tile coatings" by BASF Corporation, 1 pg., 1998-2003.
Ferro Corporation, "Cool Colors & Eclipse Heat and Energy Saving Pigments," 2 pgs., 1999-2003.
Ferro Corporation, "How Cool Colors & Eclipse Work," 3 pgs., 2003.
Gifty Osel-Premple, et al, "Synthesis and Application of Flurocarbon Functionalized Mesoporous Silica" Materkals Engineering and Sciences Division # 574, 2006.
H. Akabari, "Cool Colored Materials for Roofs," Lawrence Radiation Laboratory, presented at Emerging Technologies in Energy Efficiency-Summer 2004, San Francisco, Oct. 14, 2004.
L. Sung, et al, "Characterization of Coating Microstructure Using Laser Scanning Confocal Microscopy," Polymer Materials, Science and Engineering, 83, 242-344, 2000.
Project Advisory Committee Meeting, "Development of Cool Colored Rooting Materials," Oak Ridge national laboratory and Livemore Berkeley National Laboratory, 55 pgs., Mar. 11, 2003.
Rhonda Stroud, "Silica as Nanoglue," Naval Research Laboratory, American Physical Society, Mar. 2000.
Silberline Manufacturing Co., Inc., "StarBrite," 1 pg., 2003.
T. A. Germer, et al., "Modeling the appearance of special effect pigment coatings, " Surface Scattering and Diffraction for Advance Metrology, Proc., SPIE 4-447, 77-96, 2001.
Y. Jiang, et al. "Novel Pigment Approaches in Optically Variable Security Inks Including Polarizing Cholesteric Liquid Crystal (CLC) Polymers," Optical Security and Counterfeit Deterrence Techniques IV, SPIE 4677, 2000.
M. Kobayashi et al., "Photcatalytic Activity of Titanium Dioxide and Zinc Oxide," Cosmetics & Toiletries, vol. 111, Jun. 1997, pp. 83-85.

US 10,246,879 B2

ROOFING GRANULES WITH HIGH SOLAR REFLECTANCE, ROOFING PRODUCTS WITH HIGH SOLAR REFLECTANCE, AND PROCESSES FOR PRODUCING SAME

CROSS-REFERENCE TO RELATED APPLICATIONS

The present application is a division of pending U.S. patent application Ser. No. 12/601,169, having a 371 date of Mar. 31, 2010, which was a national phase of International Application No. PCT/US2008/064676, filed May 23, 2008, which claimed the priority of U.S. Provisional Patent Application Ser. No. 60/939,989 filed May 24, 2007.

BACKGROUND OF THE INVENTION

1. Field of the Invention

The present application relates to roofing granules and roofing products including roofing granules, such as roofing shingles.

2. Brief Description of the Prior Art

Asphalt shingles are conventionally used in the United States and Canada as roofing and siding materials. Roofing granules are typically distributed over the upper or outer face of such shingles. The roofing granules, in general are formed from mineral materials, and serve to provide the shingle with durability. They protect the asphalt from the effects of the solar radiation (in particular from the degradative effects of ultraviolet rays) and of the environment (wind, precipitation, pollution, and the like), and contribute to better reflection of incident radiation. The granules moreover are typically colored, naturally or artificially by way of the application of pigments, to meet the aesthetic requirements of the user.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. For example, U.S. Pat. No. 1,898,345 to Deming discloses coating a granular material with a coating composition including a sodium silicate, a coloring pigment, and a colloidal clay, and heating below the fusing temperature of sodium silicate, and subsequently treating with a solution, such as a solution of calcium or magnesium chloride, or aluminum sulphate, that will react with the sodium silicate to form an insoluble compound. Similarly, U.S. Pat. No. 2,378,927 to Jewett discloses a coating composition for roofing granules consisting of sodium silicate, and clay or another aluminum-bearing compound such as sodium aluminate, or cryolite or other insoluble fluorides such as sodium silicofluoride, and a color pigment. The coating is then heat cured at a temperature above the dehydration temperature of the coating materials but below the fusion temperature at which the combination of materials fuses, thus producing a non-porous, insoluble weather-resistant cement. Roofing granules are typically produced using inert mineral particles with metal-silicate binders and clays as a latent heat reactant at an elevated temperature, for example, such as those described in U.S. Pat. No. 2,981,636. The granules are employed to provide a protective layer on asphaltic roofing materials such as shingles, and to add aesthetic values to a roof.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Mineral surfaced asphalt shingles, such as those described in ASTM D225 or D3462, are generally used in steep-sloped roofs to provide water-shedding function while adding aesthetically pleasing appearance to the roofs. The asphalt shingles are generally constructed from asphalt-saturated roofing felts and surfaced by pigmented color granules, such as those described in U.S. Pat. No. 4,717,614. Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77° C. on the surface of black roofing shingles on a sunny day with 21° C. ambient temperature. Absorption of solar heat may result in elevated temperatures at the shingle's surroundings, which can contribute to the so-called heat-island effects and increase the cooling load to its surroundings. It is therefore advantageous to have roofing shingles that have high solar reflectivity in order to reduce the solar heat absorption. The surface reflectivity of an asphalt shingle largely depends on the solar reflectance of the granules that are used to cover the bitumen.

In recent years, the state of California has implemented a building code requiring the low-sloped roofs to have roof coverings with solar reflectance greater than 70%. To achieve such high level of solar reflectance, it is necessary to coat the roof with a reflective coating over granulated roofing products, since the granules with current coloring technology are not capable of achieving such high levels of solar reflectance. However, polymeric coatings applied have only a limited amount of service life and will require re-coat after certain years of service. Also, the cost of adding such a coating on roof coverings can be relatively high.

In order to reduce the solar heat absorption, one may use light colored roofing granules which are inherently more reflective towards the solar radiation. White pigment containing latex coatings have been proposed and evaluated by various manufacturers. However, consumers and homeowners often prefer darker or earth tone colors for their roof. In recent years, there have been commercially available roofing granules that feature a reflective base coat (i.e., a white coat) and a partially coated top color coat allowing the reflective base coat to be partially revealed to increase solar reflectance. Unfortunately, these granules have a "washed-out" color appearance due to the partially revealed white base coat.

Other manufactures have also proposed the use of exterior-grade coatings that were colored by infrared-reflective pigments for deep-tone colors and sprayed onto the roof in the field. U.S. Patent Application Publication No.2003/0068469 A1 discloses an asphalt-based roofing material comprising mat saturated with an asphalt coating and a top coating having a top surface layer that has a solar reflectance of at least 70%. U.S. Patent Application Publication No. 2003/0152747 A1 discloses the use of granules with solar reflectance greater than 55% and hardness greater than 4 on the Moh's scale to enhance the solar reflectivity of asphalt based roofing products. However, there is no control of color blends and the novel granules are typically available only in white or buff colors. U.S. Patent Application Publication No. 2005/0074580 A1 discloses a non-white construction surface comprising a first reflective coating and a second reflective coating with total direct solar reflectance of at least 20%.

Also, there have been attempts in using special near-infrared reflective pigments in earth-tone colors to color roofing granules for increased solar reflectance. However, the addition of kaolin clays, which are used to make the metal-silicate binder durable through heat curing, inevitably reduce the color strength or the color intensity of the pigment.

Colored roofing granules can also be prepared using a metal silicate binder without adding clay and curing the binder at temperatures greater than glass sintering temperature, or through a "pickling" process by applying acid. However, these alternatives require either very high temperatures, or the use of corrosive chemicals, and in many cases could result in loss of color due to pigment degradation by the acid.

In the alternative, a non-silicate binder, such as a synthetic polymeric binder, can be used to coat the inert mineral materials in order to produce roofing granules with dark colors and high solar reflectance. However, the long-term durability and cost for polymeric coatings are not as advantageous as the silicate binders.

Another approach is provided by solar control films that contain either thin layer of metal/metal oxides or dielectric layers through vacuum deposition, and which have been commercially available for use in architectural glasses.

There is a continuing need for roofing materials, and especially asphalt shingles, that have improved resistance to thermal stresses while providing an attractive appearance.

SUMMARY OF THE INVENTION

The present invention provides roofing granules, which have high solar reflectance, such as at least 70 percent, as well as roofing products such as shingles provided with such solar reflective roofing granules. The present invention also provides a process for preparing solar reflective roofing granules. In one presently preferred embodiment, the process of the present invention comprises providing a binder, inert mineral particles, and solar reflective particles, dispersing the inert mineral particles and the solar reflective particles in the binder to form a mixture, forming the mixture into uncured granules; and curing the binder to form cured roofing granules. Preferably, the process of the present invention includes selecting the solar reflective particles to provide granules having greater than about 60 percent, and more preferably greater than about 70 percent solar reflectance.

In another presently preferred embodiment, the present invention provides a process for preparing solar reflective roofing granules comprising providing a binder and inert mineral particles to form a mixture, forming the mixture into uncured granule bodies having an exterior surface, adhering solar reflective particles to the exterior surface of the uncured granule bodies, and curing the binder. In one aspect of this embodiment of the process of the present invention, the solar reflective particles are mechanically adhered to the exterior surface of the uncured granule bodies. In another aspect of this embodiment of the process of the present invention, the process further comprises mixing the solar reflective particles with a fluid carrier to form a paste or coating and adhering the solar reflective particles to the exterior surface of the granule bodies by applying the paste to the exterior surface of the granule bodies.

Preferably, the process further comprises sizing the uncured granules by screening. In one presently preferred embodiment of the process of the present invention, the uncured granules are heated to cure the binder. In one aspect, the present process further comprises surface treating the cured roofing granules. In one presently preferred embodiment of the process of the present invention, the inert mineral particles comprise uncalcined kaolin, the binder comprises metal silicate, and the binder is cured by heating the uncured granules at from about 500 degrees C. to 800 degrees C.

The present invention also provides solar reflective roofing granules comprising a binder, inert mineral particles, and solar reflective particles, with the inert mineral particles and the solar reflective particles being dispersed in the binder. Preferably, the solar reflective particles are selected from the group consisting of titanium dioxides, metal pigments, titanates, and metal reflective pigments. Preferably, the inert mineral particles have an average particle size from about 0.1 micrometers to 40 micrometers, and more preferably from about 0.25 micrometers to 20 micrometers. Preferably, the solar reflective roofing granules themselves have an average particle size from about 0.1 mm to 3 mm, and more preferably from about 0.5 mm to 1.5 mm. Preferably, the binder is selected from the group consisting of silicate, silica, phosphate, titanate, zirconate, and aluminate binders, and mixtures thereof. In one aspect, the binder preferably further comprises an inorganic material selected from the group consisting of aluminosilicate and kaolin clay.

In another aspect, the present invention also provides a process for preparing solar reflective roofing granules, in which the process comprises providing ceramic particles; forming the ceramic particles into uncured granule bodies having an exterior surface; adhering solar reflective particles to the exterior surface of the uncured granule bodies; and sintering the uncured granule bodies to form solar reflective roofing granules. Preferably, the solar reflective particles are mechanically adhered to the exterior surface of the uncured granule bodies. In this aspect, the present process further preferably comprises providing a sintering binder and mixing the sintering binder with the ceramic particles to form a mixture and subsequently forming the mixture including the ceramic particles into uncured granule bodies. In this aspect, the present invention also provides solar reflective roofing granules having an exterior surface, the roofing granules comprising sintered ceramic particles; and solar reflective particles; wherein at least some of the solar reflective particle are proximate the exterior surface of the solar reflective particles. Preferably, the solar reflective particles are selected from the group consisting of titanium dioxides, metal pigments, titanates, and metal reflective pigments.

The present invention also provides roofing products, such as bituminous roofing shingles, including solar reflective roofing granules according to the present invention.

DETAILED DESCRIPTION

Figure 1:
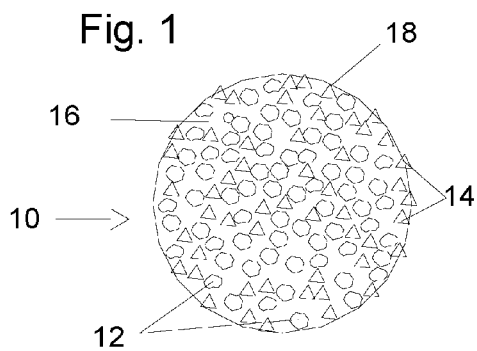
FIG. 1 is a schematic sectional elevational representation of a roofing granule according to a first embodiment of the present invention.

As used in the present specification and claims, "solar reflective," and "solar heat-reflective" refer to reflectance in the near infrared range (700 to 2500 nm) of the electromagnetic spectrum, and "high solar reflectance" means having an average reflectance of at least about 70 percent over the near infrared range (700 to 2500 nm) of the electromagnetic spectrum.

As used in the present specification and claims, "solar reflective particle" means a particulate material having a solar reflectance of at least 60 percent, and preferably at least about 70 percent.

As used in the present specification and claims, "solar reflective functional pigment" denotes a pigment selected from the group consisting of light-interference platelet pigments including mica, light-interference platelet pigments including titanium dioxide, mirrorized silica pigments based upon metal-doped silica, metal flake pigments, metal oxide coated flake pigments, and alumina. As used in the present specification and claims, "granule coloring pigment" denotes a conventional metal oxide-type pigment employed to color roofing granules.

Preferably, the present invention provides highly reflective, solid, durable, and crush-resistance granules suitable for roofing applications with the sizes ranging from −10 to +40 U.S. mesh.

Preferably, the solar reflective roofing granules according to the present invention have a solar reflectance of at least about 60 percent, and more preferably at least about 70 percent.

Roofing granules according to the present invention can be made by synthetically forming a "green" or uncured granule body, adhering highly solar reflective particles to the uncured granule body, and curing the uncured granule body.

The mineral particles employed in the process of the present invention are preferably chemically inert materials. The mineral particles preferably have an average particle size of from about 0.1 micrometers to about 40 micrometers, and more preferably from about 0.25 micrometers to about 20 micrometers. Stone dust can be employed as the source of the mineral particles in the process of the present invention. Stone dust is a natural aggregate produced as a by-product of quarrying, stone crushing, machining operations, and similar operations. In particular, dust from talc, slag, limestone, granite, marble, syenite, diabase, greystone, quartz, slate, trap rock, basalt, greenstone, andesite, porphyry, rhyolite, greystone, and marine shells can be used, as well as manufactured or recycled manufactured materials such as ceramic grog, proppants, crushed bricks, concrete, porcelain, fire clay, and the like. Ceramic materials, such as silicon carbide and aluminum oxide of suitable dimensions can also be used. Preferably, the mineral particles are manufactured from crushing naturally occurring rocks with low free silica into suitable sizes for their UV opacity and protection to asphalt when the roofing granules according to the present invention are employed to protect bituminous roofing materials such as asphalt shingles. Such silica-deficient rocks are generally dark in color and have low solar reflectance in the range around 8 to 15 percent. Conventionally, it is necessary to coat granules prepared from these naturally-derived rocks with heavy coatings or multiple coats in order to significantly increase the solar reflectance. Even so, the highest achievable solar reflectance is only limited to about 60%. Although one may reduce the particle sizes to further increase the solar reflectance, the surface coverage and the exposure of asphalt can be affected.

Advantageously, the process of the present invention can produce highly reflective granules that do not require additional coatings to achieve high solar reflectance, such as 70 percent solar reflectance, while providing particle size distributions similar to conventional #11-grade roofing granules.

Thus, the present invention provides a process for preparing solar reflective roofing granules. In one aspect, the process of the present invention comprises providing a binder, inert mineral particles, and solar reflective particles; dispersing the inert mineral particles and the solar reflective particles in the binder to form a mixture; forming the mixture into uncured or "green" granules or granule bodies; and curing the binder.

The granules can be formed by the methods disclosed in United States Patent Publication 2004/0258835 A1, incorporated herein by reference.

The "green" or uncured granules can be formed by using relatively low-cost raw materials, such as clay and/or granule dust from the waste stream of granule crushing, and adding water and/or a suitable binder followed by a suitable granulation or agglomeration process to form the uncured granules.

The solar reflective particles can be directly incorporated into the uncured granules by blending with other starting raw materials, or the solar reflective particles can be added during a later stage of the granulation/agglomeration step. In the alternative, the solar reflective particles can be added to the surface of the formed uncured granules either by blending the solar reflective particles in the form of a dry powder with the still moist, uncured granules, or coating the uncured granules in a form of a paste or coating.

In one aspect of the process of the present invention, "green" or uncured granules can be formed from a mixture of mineral particles, solar reflective particles and binder, ranging from about 95% by weight binder to less than about 10% by weight binder, and the uncured solar reflective roofing granules preferably are formed from a mixture that includes from about 10% to 40% by weight binder.

The binder can be a binder selected from the group consisting of silicate, silica, phosphate, titanate, zirconate, and aluminate binders, and mixtures thereof. The binder can further comprise an inorganic material selected from the group consisting of aluminosilicate and kaolin clay. In one aspect of the present invention, the binder is a soluble alkali metal silicate, such as aqueous sodium silicate or aqueous potassium silicate. The soluble alkali metal silicate is subsequently insolubilized by heat or by chemical reaction, such as by reaction between an acidic material and the alkali metal silicate, resulting in cured solar reflective granules. The binder may also include additives for long term outdoor durability and functionality.

When an alkali metal-silicate binder such as sodium silicate is employed in the preparation of solar reflective roofing granules, the binder can include a heat-reactive aluminosilicate material, such as clay, for example, kaolin clay. Alternatively, it is possible to insolubilize the metal silicate binder chemically by reaction with an acidic material, for example, ammonium chloride, aluminum chloride, hydrochloric acid, calcium chloride, aluminum sulfate, and magnesium chloride, such as disclosed in U.S. Pat. Nos. 2,591,149, 2,614,051, 2,898,232 and 2,981,636, or other acidic material such as aluminum fluoride. The binder can also be a controlled release sparingly water soluble glass such as a phosphorous pentoxide glass modified with calcium fluoride, such as disclosed in U.S. Pat. No. 6,143,318. The most commonly used binder for conventional granule coating is a mixture of an alkali metal silicate and an alumino-silicate clay material.

The mixture of mineral particles, solar reflective particles and binder can be formed into uncured solar reflective roofing granules, using a forming process such as press, molding, cast molding, injection molding, extrusion, spray granulation, gel casting, pelletizing, compaction, or agglomeration. Preferably, the resulting uncured solar reflective roofing granules have sizes between about 50 micrometer and 5 mm, more preferably between about 0.1 mm and 3 mm, and still more preferably between about 0.5 mm and 1.5 mm. The uncured solar reflective roofing granules can be formed using a conventional extrusion apparatus. For example, aqueous sodium silicate, kaolin clay, mineral particles, and solar reflective particles and water (to adjust mixability) can be charged to a hopper and mixed by a suitable impeller before being fed to an extrusion screw provided in the barrel of the extrusion apparatus, such as disclosed, for example, in United States Patent Publication 2004/0258835 A1. Alternatively, the ingredients can be charged to the extruder continuously by gravimetric feeds. The screw forces the mixture through a plurality of apertures having a predetermined dimension suitable for sizing roofing granules. As the mixture is extruded, the extrudate is chopped by suitable rotating knives into a plurality of uncured solar reflective roofing granules, which are subsequently fired at an elevated temperature to sinter or densify the binder.

When the formed granules are fired, such as in a rotary kiln, at an elevated temperature, such as at least 800 degrees C., and preferably at 1,000 to 1,200 degrees C., and the binder densifies to form solid, durable, and crush-resistance granules.

Examples of clays that can be employed in the process of the present invention include kaolin, other aluminosilicate clays, Dover clay, bentonite clay, etc.

Suitable solar reflective particles include titanium dioxides such as rutile titanium dioxide and anatase titanium dioxide, metal pigments, titanates, and mirrorized silica pigments.

Examples of mirrorized silica pigments that can be employed in the process of the present invention include pigments such as Chrom Brite™ CB4500, available from Bead Brite, 400 Oser Ave, Suite 600, Hauppauge, N.Y. 11788. Examples of rutile titanium dioxide and anatase titanium dioxide that can be employed in the solar reflective roofing granules of the present invention include R-101 which are available from Du Pont de Nemours, P.O. Box 8070, Wilmington, Del. 19880.

Examples of metal pigments that can be employed in the solar reflective roofing granule of the present invention include aluminum flake pigment, copper flake pigments, copper alloy flake pigments, and the like. Metal pigments are available, for example, from ECKART America Corporation, Painesville, Ohio 44077. Suitable aluminum flake pigments include water-dispersible lamellar aluminum powders such as Eckart RO-100, RO-200, RO-300, RO-400, RO-500 and RO-600, non-leafing silica coated aluminum flake powders such as Eckart STANDART PCR-212, PCR 214, PCR 501, PCR 801, and PCR 901, and STANDART Resist 211, STANDART Resist 212, STANDART Resist 214, STANDART Resist 501 and STANDART Resist 80; silica-coated oxidation-resistant gold bronze pigments based on copper or copper-zinc alloys such as Eckart DOROLAN 08/0 Pale Gold, DOROLAN 08/0 Rich Gold and DOROLAN 10/0 Copper.

Examples of titanates that can be employed in the solar reflective roofing granules of the present invention include titanate pigments such as colored rutile, priderite, and pseudobrookite structured pigments, including titanate pigments comprising a solid solution of a dopant phase in a rutile lattice such as nickel titanium yellow, chromium titanium buff, and manganese titanium brown pigments, priderite pigments such as barium nickel titanium pigment; and pseudobrookite pigments such as iron titanium brown, and iron aluminum brown. The preparation and properties of titanate pigments are discussed in Hugh M. Smith, High Performance Pigments, Wiley-VCH, pp. 53-74 (2002).

Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Aluminum oxide, preferably in powdered form, can be used as solar-reflective additive in the color coating formulation to improve the solar reflectance of colored roofing granules without affecting the color. The aluminum oxide should have particle size less than #40 mesh (425 micrometers), preferably between 0.1 micrometers and 5 micrometers. More preferably, the particle size is between 0.3 micrometers and 2 micrometers. The alumina should have a percentage of aluminum oxide greater than 90 percent, more preferably greater than 95 percent. Preferably the alumina is incorporated into the granule so that it is concentrated near and/or at the outer surface of the granule.

In addition, granule coloring pigments such as iron oxide, white pigments such as lithopone, zinc sulfide, zinc oxide, and lead oxide, void pigments such as spherical styrene/acrylic beads (Ropaque® beads, Rohm and Haas Company), and/or hollow glass beads having pigmentary size for increased light scattering, can also be mixed with the solar reflective particles and mineral particles and binder to form the uncured granules, or with the solar reflective particles to be adhered to the exterior surface of the uncured granules. In the case where an organic polymeric void pigment is employed, a lower temperature cycle is desirable to avoid alteration of or damage to such pigment.

A colored, infrared-reflective pigment can also be employed in preparing the solar reflective roofing granules of the present invention. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near-infrared non-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups. When organic colorants are employed, a low temperature cure process is preferred to avoid thermal degradation of the organic colorants.

The solar-reflective roofing granules of the present invention can include conventional coatings pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

The solar reflective roofing granules of the present invention can also include light-interference platelet pigments. Light-interference platelet pigments are known to give rise to various optical effects when incorporated in coatings, including opalescence or "pearlescence."

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic ™ high chroma crystal effect pigment based upon Al2O3 platelets coated with metal oxides, including Xirallic T 60-10 WNT crystal silver, Xirallic T 60-20 WNT sunbeam gold, and Xirallic F 60-50 WNT fireside copper; ColorStream ™ multi color effect pigments based on SiO2 platelets coated with metal oxides, including ColorStream F 20-00 WNT autumn mystery and ColorStream F 20-07 WNT viola fantasy; and ultra interference pigments based on titanium dioxide and mica.

The amount of solar reflective particles added is preferably such that the resultant solar reflective roofing granules have a solar reflectance of at least about 60 percent, and preferably at least about 70 percent, while not unduly adversely affecting granulation.

In one presently preferred embodiment uncalcined kaolin can be employed as the source of mineral particles and metal-silicates can be employed as binder to form uncured granules. In this case, it is preferred that the kaolin can be formed into granule body by a suitable granulation or agglomeration process and permitted to dry to an uncured green body either by simple rotary dryer, in a fluidized bed drier, or by drying in an oven in a suitable tray or on a continuous belt. The reflective pigments can then be incorporated into sodium silicate and the resultant mixture can then be soaked into the green body of kaolin clay due to its high porosity and capillary forces. Advantageously, the resultant uncured granules can be heat cured at a temperature ranging from about 500 to 800 degrees C. to react the kaolin and the sodium silicate, which can be handled by simple kiln or dryer to further reduce manufacturing cost, to form durable, hard granules suitable for roofing applications.

The resultant granules can also be surface treated with siliconates or suitable oils to enhance its adhesion to asphalt and also to reduce their staining potentials.

Other methods of forming a granular body and incorporating solar reflective particles during the formation of the said body will become apparent to those who are skilled in the art.

In yet another aspect of the present invention, the binder comprises a chemically bonded cement, preferably, a chemically bonded phosphate cement. It is preferred in this aspect that the binder comprise a chemically bonded phosphate cement prepared from a cementitious exterior coating composition including at least one metal oxide or a metal hydroxide slightly soluble in an acidic aqueous solution to provide metal cations and a source of phosphate anions. Preferably, the relative quantities of the at least one metal oxide or metal hydroxide and at least one source of phosphate anion are selected to provide a cured coating having a neutral pH, the coating composition being cured by the acid-base reaction of the at least one metal oxide or hydroxide and the source of phosphate anions. Preferably, in this aspect the binder comprises at least one metal oxide or metal hydroxide as a source of metal cations and at least one phosphate. Preferably, at least one metal oxide or metal hydroxide comprises at least one clay. Preferably, the binder further includes colloidal silica.

Preferably, the at least one metal oxide or metal hydroxide is selected from the group consisting of alkali earth metal oxides, alkaline earth hydroxides, aluminum oxide, oxides of first row transition metals, hydroxides of first row transition metals, oxides of second row transition metals, and hydroxides of second row transition metals. More preferably, the at least one metal oxide or metal hydroxide is selected from the group consisting of magnesium oxide, calcium oxide, iron oxide, copper oxide, zinc oxide, aluminum oxide, cobalt oxide, zirconium oxide and molybdenum oxide. Preferably, the at least one metal oxide or metal hydroxide is sparingly soluble in an acidic aqueous solution. In addition, it is preferred that the at least one metal oxide or metal hydroxide comprise from about 10 to 30% by weight of the binder.

Preferably, the at least one phosphate is selected from the group consisting of phosphoric acid and acid phosphate salts. More preferably, the at least phosphate is selected from the group consisting of phosphoric acid, and acid salts of phosphorous oxo anions, and especially salts including at least one cation selected from the group consisting of ammonium, calcium, sodium, potassium, and aluminum cations. In particular, it is preferred that the at least one phosphate be selected from the group consisting of phosphoric acid, ammonium hydrogen phosphate, ammonium dihydrogen phosphate, potassium hydrogen phosphate, potassium dihydrogen phosphate, potassium phosphate, calcium hydrogen phosphate, calcium dihydrogen phosphate, magnesium hydrogen phosphate, sodium hydrogen phosphate, sodium dihydrogen phosphate, aluminum hydrogen phosphate, aluminum dihydrogen phosphate, and mixtures thereof. Commercial grades of calcium phosphate salts, such "NSP" (normal super phosphate) and "TSP" (triple super phosphate) can also be used. Potassium dihydrogen phosphate ("monopotassium phosphate"), aluminum hydrophosphate ($AlH_3(PO_4).2H_2O$), monoaluminum phosphate ($Al(H_2PO_4)_3$) and magnesium dihydrogen phosphate are especially preferred. Preferably, the at least one phosphate comprises from about 10 to 60% by weight of the binder.

In this aspect of solar reflective roofing granules according to the present invention, the cure of the binder depends on the composition of the chemically bonded cement. A broad range of cure conditions, ranging from rapid room temperature curing to low energy cures at moderately elevated temperatures to high energy cures at more elevated temperatures can be attained by varying the metal oxide or hydroxide and the phosphate. Optionally, the reactivity of the metal oxide or hydroxide can be reduced by calcining the metal oxide or metal hydroxide prior to preparing the binder. In addition, the pot life of the binder can be extended by the optional addition of a retardant such as boric acid.

In another aspect, the solar reflective roofing granules according to the present invention can include an inert mineral core material, covered with a layer of mineral particles, solar reflective particles, and binder.

The inert mineral core material can be a suitably sized mineral particle such as described above, or in the alternative, the mineral core material can be a solid or hollow glass spheres. Solid and hollow glass spheres are available, for example, from Potters Industries Inc., P.O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTTINI impact beads product grade A with a size range of 600 to 850 micrometers (U.S. sieve size 20-30), and QCEL hollow spheres, product code 300 with a mean particle size of 0.090 mm. Glass spheres can be coated or treated with a suitable coupling agent if desired for better adhesion to the binder of the coating composition.

In another aspect of the present invention, solar reflective roofing granules are produced by an accretion process such as disclosed in U.S. Pat. No. 7,067,445, incorporated herein in its entirety by reference. The starting materials employed are mineral particles and binder, and optionally solar reflective particles. The starting materials are preferably ground, if necessary, by ball milling or another attrition process, to form particles having a mean particle size of about 20 microns or less, more preferably, about 15 microns or less, and most preferably about 10 microns or less, expressed in terms of particle diameter (or average diameter for non-spherical particles). The ground starting materials are combined with a liquid, such as water, and mixed in an intensive mixer, such as an Eirich mixer (Eirich Machines Inc., Gurnee, Ill. 60031) having a rotatable confinement vessel having a rotatable table, or pan, and a rotatable impacting impeller. In an intensive mixer the rotatable table and impeller rotate in opposite directions. Sufficient water or other liquid is added to cause essentially spherical pellets of the starting material mixture to be formed (about 15 to 40 weight percent water based on the starting materials). After such pellets have formed, a second mixture is added, and the mixture is further operated to cause accretion of the added material to the pellets being formed. The second mixture includes solar reflective particles and binder, and optionally mineral particles and colorant material particles. The second mixture preferable comprises up to 25 percent, and more preferably, from about 5 to 15 percent by weight, of the starting materials. The pellet so formed are then dried to a moisture content of less than about 10 weight percent, for example, in a drier at a temperature between about 100 degree C. and 300 degrees C. to form "green" roofing granules. The "green" roofing granules so formed are subsequently cured. Depending on the nature of the binder, the "green" granules can be cured by heating at an elevated temperature to cure the binder. For example, when the binder comprises aqueous sodium silicate and kaolin clay, the "green" granules can be cured by heating at a temperature between about 400 degrees C. and 800 degrees C. to solidify the binder.

In another aspect of the present invention, solar reflective roofing granules are produced by an accretion process similar to that disclosed in U.S. Pat. No. 7,067,445. In this aspect of the present invention, the starting materials employed are ceramic particles and a sinter binder, and optionally solar reflective particles.

Suitable ceramic particles include oxides, such as aluminum oxides, such as alumina, silicon oxides, such as silica, and mixtures thereof. Preferably, the ceramic particles comprise silica and alumina, and comprise at least 80 percent by weight of the starting materials, expressed in terms of the calcined (essentially anhydrous) weight, and more preferably, at least about 90 percent of the calcined weight.

"Calcined" as used herein refers to a heating process to which a material has been subjected to release water and other volatiles from the material, such as organic materials and chemically bound water such water of hydration. Ore materials that have been fully calcined exhibit very low loss on ignition ("LOI") and moisture content, for example, about 1 to 2 percent by weight or less. Uncalcined ore materials such as bauxites and clays can contain from about 10 to about 40 percent volatiles. "Partially calcined" material typically exhibit total volatiles (LOI and moisture content) of about 5 to 8 percent. Typical calcination temperatures are usually less than 1000 degrees C.

The ceramic particles can be clays (predominantly hydrated alumina) such as kaolin, diaspore clay, burley clay, flint clay, bauxitic clays, nature or synthetic bauxites, mixtures thereof and the like. The ceramic particles can be calcined or partially calcined. The ceramic particles are preferably formed from oxides, aluminates, and silicates, such as magnesium silicates, and preferably comprise up to 50 percent by weight, more preferably at least 90 percent by weight, and most preferably at least 90 percent by weight of the starting materials.

The starting materials can also include various sintering aids, such as bentonite clay, iron oxide, boron, boron carbide, aluminum diboride, boron nitride, boron phosphide, other boron compounds, or fluxes such as sodium carbonate, lithium carbonate, titania, calcium carbonate, and sodium silicate, which materials can be added in amounts up to about 10 percent by weight to aid in sintering.

In addition, a sintering binder, such as wax, a starch, or resin, such as gelatinized cornstarch, polyvinyl alcohol, or mixture thereof, can be added to the initial mixture to aid in pelletizing the mixture and increase the green strength of the pellets prior to sintering. The sintering binder can be added in an amount of about 0 to 6 percent by weight of the starting materials.

The starting materials are preferably ground, if necessary, by ball milling or another attrition process, to form particles having a mean particle size of about 20 microns or less, more preferably, about 15 microns or less, and most preferably about 10 microns or less, expressed in terms of particle diameter (or average diameter for non-spherical particles). The ground starting materials are combined with a liquid, such as water, and mixed in an intensive mixer. Sufficient water or other liquid is added to cause essentially spherical pellets of the starting material mixture to be formed (about 15 to 40 weight percent water based on the starting materials). After such pellets have formed, a second mixture is added, and the mixture is further operated to cause accretion of the added material to the pellets being formed. The second mixture includes solar reflective particles and sintering binder, and optionally ceramic particles, sintering aid, and colorant material particles. The second mixture preferable comprises up to 25 percent, and more preferably, from about 5 to 15 percent by weight, of the starting materials. The pellet so formed are then dried to a moisture content of less than about 10 weight percent, for example, in a drier at a temperature between about 100 degree C. and 300 degrees C. to form "green" roofing granules.

The "green" roofing granules so formed are subsequently sintered in a furnace at a sintering temperature until a specific gravity of from about 2.1 to 4.1 grams per cubic centimeter is obtained, depending on the composition of the starting materials, and the desired specific gravity of the roofing granules. Sintering generally causes a reduction of up to about 20 percent in pellet size as well as an increase in specific gravity. Suitable sintering temperatures are generally about 1150 degrees C. and above, more preferably at about 1300 degrees C., still more preferably about 1500 degrees C., although sintering temperatures can be as high as 1600 degrees C.

In another aspect, roofing granule core particles are prepared by a sintering process as described above, and are subsequently treated to provide a surface layer with a desired functionality, such as solar reflectivity, biocidal activity, or other functionality. The surface coating can include solar reflective particles and a binder curable at temperatures below the sintering range. In this case, the solar reflective particles can optionally be omitted from the core particles. Thus, in this aspect the surface coating can be formed from a coating composition including a binder selected from the group consisting of silicate, silica, phosphate, titanate, zirconate, and aluminate binders, and mixtures thereof, and the binder can further comprise an inorganic material selected from the group consisting of aluminosilicate and kaolin clay.

Figure 2:
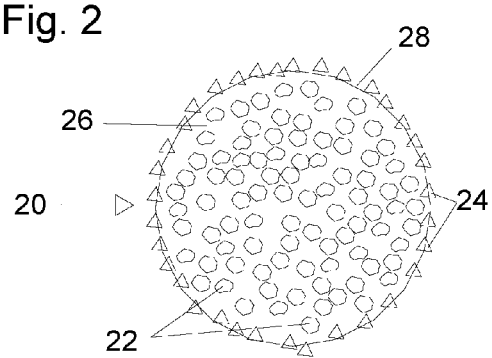
FIG. 2 is a schematic sectional elevational representation of a roofing granule according to a second embodiment of the present invention.
Figure 3:
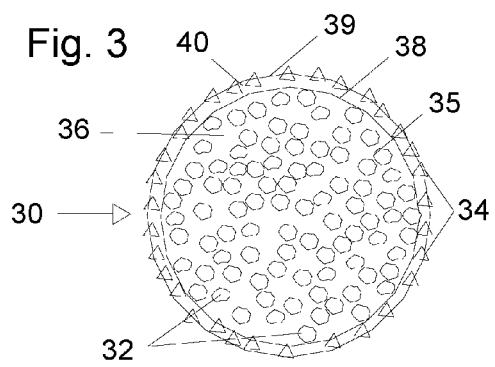
FIG. 3 is a schematic sectional elevational representation of a roofing granule according to a third embodiment of the present invention.

Referring now to the drawings, in which like reference numerals refer to like elements in each of the several views, there are shown schematically in FIGS. 1, 2, and 3 examples of solar reflective roofing granules according to the present invention.

FIG. 1 is a schematic cross-sectional representation of a first embodiment of solar reflective roofing granule 10 according to the present invention. The solar reflective roofing granule 10 comprises a plurality of inert mineral particles 12 and solar reflective particles 14 dispersed in a binder 16. The solar reflective roofing granule 10 has an exterior surface 18. Solar reflectance is provided to the solar reflective roofing granule 10 by virtue of the solar reflective particles 14 provided at or proximate the exterior surface 18 of the solar reflective roofing granule 10. The solar reflective roofing granule 10 can be formed by extrusion, agglomeration, roll compaction or other forming techniques. While the solar reflective roofing granule 10 is shown schematically as a sphere in FIG. 1, solar reflective roofing granules according to the present invention can assume any regular or irregular shape.

After formation, depending on binder chemistry and the nature of the colorant, the solar reflective roofing granule 10 can be fired at 250 degrees C. or higher (or less, in the case of organic colorants), preferably from 500 degrees C. to 800 degrees C., to insolubilize the binder 16. The particle size of the solar reflective roofing granule 10 preferably ranges from about 0.1 mm to 3 mm, and more preferably from about 0.5 mm to 1.5 mm. The inert mineral particles 12 are minute particulates or dust, such as for example, particulates of rhyolite, syenite, bauxite and other rock sources formed as a byproduct from quarry, crushing and similar operations. The inert mineral particles 12 preferably have a particle size ranging from about 0.1 micrometer to 40 micrometers, and more preferably from about 0.25 micrometer to 20 micrometers. The binder 16 is preferably selected from the group consisting of silicate, silica, phosphate, titanate, zirconate and aluminate binders, and mixtures thereof. The binder content of the solar reflective roofing granule 10 preferably ranges from 10% to 90% by weight. In addition, aluminosilicate, kaolin clay and other inorganic materials can be added to the binder 16 to improve the mechanical, chemical, or physical properties of the solar reflective roofing granule 10.

FIG. 2 is a schematic cross-sectional representation of a second embodiment of solar reflective roofing granule 20 according to the present invention. The solar reflective roofing granule 20 comprises a plurality of inert mineral particles 22 dispersed in a binder 26, and solar reflective particles 24 adhered to the exterior surface 28 of the solar reflective roofing granule 20. The solar reflective granules 20 of this second embodiment can be prepared by mixing the inert mineral particles 22 with the binder 26 and forming uncured granule bodies (not shown) from the mixture by granulation, agglomeration or another technique. The mixture is preferably prepared so that the binder remains somewhat tacky or adhesive after the uncured granule bodies have been formed. The uncured granule bodies are then dusted with the solar reflective particles 24 so that the solar reflective particles mechanically adhere to the exterior surface of the uncured granule bodies to form uncured roofing granules (not shown). The uncured roofing granules are then subjected to elevated temperature to cure the binder to form the solar reflective roofing granules 20.

FIG. 3 is a schematic cross-sectional representation of a third embodiment of a solar reflective roofing granule 30 according to the present invention. The solar reflective roofing granule 30 comprises a plurality of inert mineral particles 32 dispersed in a binder 36 to form an inert composite mineral body or granule body 35 having an exterior surface 38, covered with a plurality of solar reflective particles 34 dispersed in an exterior binder 40.

Solar reflective activity is provided to the solar reflective roofing granule 30 by virtue of the solar reflective particles 34 provided at or proximate the exterior surface 39 of the solar reflective roofing granule 30. The solar reflective roofing granules 30 of this third embodiment can be prepared by mixing the inert mineral particles 32 with the binder 36 and forming uncured granule bodies (not shown) from the mixture by granulation or another technique. The uncured granule bodies are then covered with a slurry of the solar reflective particles 34 dispersed in another binder material 40 so that the slurry of solar reflective particles 34 adheres to the exterior surface of the uncured granule bodies to form uncured roofing granules (not shown). The uncured roofing granules are then subjected to elevated temperature to cure the binder to form the solar reflective roofing granules 30. The binder 40 employed to form the slurry of solar reflective particles 34 can be the same as that employed to form the uncured granule bodies, or a different binder can be employed.

Figure 4:
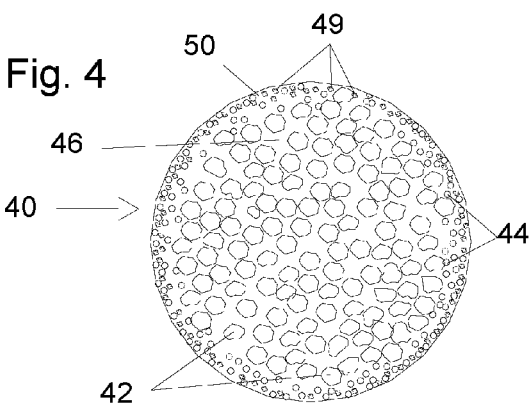
FIG. 4 is a schematic sectional elevational representation of a roofing granule according to a fourth embodiment of the present invention.
Figure 4A:
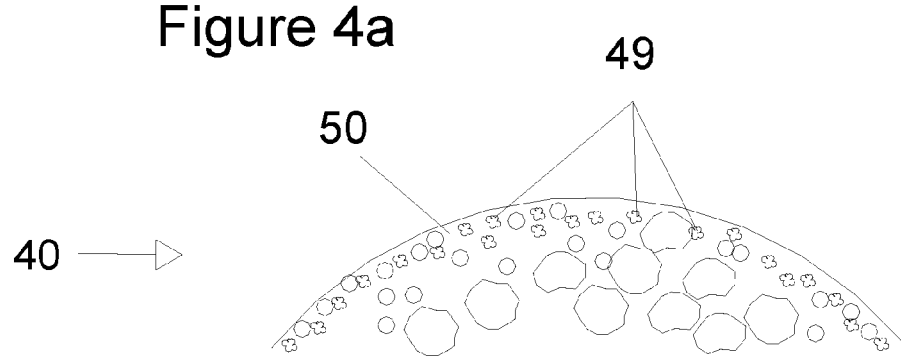
FIG. 4a is a partial fragmentary schematic sectional elevational representation of the roofing granule of FIG. 4.

FIG. 4 is a schematic cross-sectional representation of a fourth embodiment of a solar reflective roofing granule 40 according to the present invention. The solar reflective roofing granule 40 comprises a plurality of inert mineral particles 42 and dispersed in a binder 46 as well as an exterior layer 50 of solar reflective particles 44 dispersed in binder 46 proximate the surface of the roofing granule 40, and formed by a particle accretion process in an intensive mixer. The exterior layer 50 can have a thickness of from about 20 micrometers to 200 micrometers. The exterior layer 50 can also include particulate colorants 49 or dyes, better seen in the partial fragmentary view of FIG. 4*a*.

Figure 5:
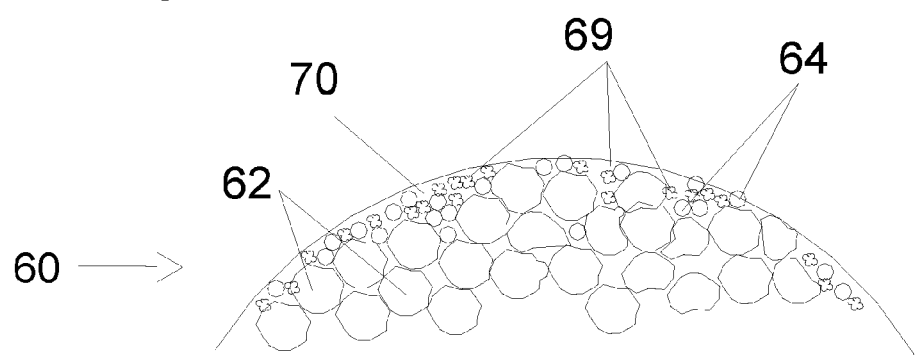
FIG. 5 is a partial fragmentary schematic sectional elevational representation according to a fifth embodiment of the present invention.

FIG. 5 is a fragmentary schematic cross-sectional representation of a fifth embodiment of a solar reflective roofing granule 60 according to the present invention. The solar reflective roofing granule 60 comprises a plurality of sintered ceramic particles 62 and an exterior layer 70 of solar reflective particles 64 sintered to the ceramic particles 62 proximate to the surface the roofing granule 60, and formed by a particle accretion process in an intensive mixer to form green pellets, followed by sintering at an elevated temperature. The exterior layer 70 can have a thickness of from about 20 micrometers to 200 micrometers. The exterior layer 90 can also include particulate colorants 69, sintered to the ceramic particles 62 and/or solar reflective particles 64.

The solar reflective roofing granules of the present invention can be employed in the manufacture of roofing products, such as asphalt shingles and bituminous membranes, using conventional roofing production processes. Typically, bituminous roofing products are sheet goods that include a non-woven base or scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The solar reflective roofing granules of the present invention can be mixed with conventional roofing granules, and the granule mixture can be embedded in the surface of such bituminous roofing products using conventional methods. Alternatively, the solar reflective roofing granules of the present invention can be substituted for conventional roofing granules in manufacture of bituminous roofing products.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation and aesthetic effect, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

EXAMPLE

Particles with high solar reflectance are prepared by agglomerating the appropriate materials in an Eirich RV02 mixer using the following procedure. A quantity of the kaolin material (Calcined Plastic Fireclay by Christy Minerals) and a drilling starch binder were disposed into an Eirich mixer and dry mixed for 30 seconds. De-ionized water was then added over a 30 second period as the mixer continued to rotate and spheres of base material were formed. After approximately four minutes of mixing the base material, binder and water, the $TiO_2$ pigment material (CR-826, available from Tronox, Oklahoma City, Okla.) was slowly added over 3 to 5 minutes to the mass of rotating spherically shaped bases by sprinkling (also known as "dusting in") the layer material on top of the bases as they were moving in the mixer until uniform distribution of the $TiO_2$ pigment on particle surface was observed. Samples contain various amounts of kaolin material and $TiO_2$ pigments which total a constant 15 lbs. The formed particles were then spread on a tray and dried in a forced air oven and were then fired to sinter in a static kiln at various temperatures to form solar reflective particles. The amount of $TiO_2$ pigments and the firing temperatures are listed in Table 1, along with the color reading, solar reflectance (ASTM C-1549 method), and the UV opacity (ARMA Granule Test Manual Test Method #9) of the resultant particles. In Table 2, the particle size data of the resultant particles are listed. As one can see, the particles have high solar reflectance with suitable sizes for roofing applications.

TABLE 1

| TiO2 | Firing Temp. | Color Reading | | | Solar | % UV |
|---|---|---|---|---|---|---|
| wt % | ° C. | L* | a* | b* | Reflectance | Opacity |
| 0 | 900 | 82.38 | 5.55 | 9.18 | 0.697 | NA |
| 0 | 1200 | 88.05 | 1.47 | 7.21 | 0.746 | 93 |
| 0 | 1450 | 87.91 | 0.82 | 11.49 | 0.78 | 94.9 |
| 20 | 900 | 84.86 | 2.14 | 9.62 | 0.725 | NA |
| 20 | 1200 | 81.71 | 2.49 | 18.14 | 0.712 | 92 |
| 20 | 1450 | 70.67 | 8.04 | 27.52 | 0.623 | 97 |
| 30 | 900 | 86.57 | 1.74 | 9.25 | 0.749 | NA |
| 30 | 1200 | 82 | 2.05 | 17.13 | 0.719 | 99 |
| 30 | 1450 | 68.95 | 8.42 | 27.08 | 0.625 | 99 |
| 40 | 900 | 87.63 | 0.74 | 7.1 | 0.749 | NA |
| 40 | 1200 | 81.51 | 1.38 | 15.07 | 0.708 | 100 |
| 40 | 1450 | 68.25 | 8.21 | 26.08 | 0.628 | 100 |

TABLE 2

| TiO2 | Firing Temp. | Sieve Analysis, wt % retaining on US mesh size | | | | | | |
|---|---|---|---|---|---|---|---|---|
| wt % | ° C. | #8 | #12 | #16 | #20 | #30 | #40 | Pan |
| 0 | 900 | 5.54 | 17.52 | 48.66 | 23.43 | 3.03 | 0.27 | 1.41 |
| 0 | 1200 | 6.42 | 16.08 | 46.62 | 25.03 | 4.24 | 0.43 | 1.19 |
| 0 | 1450 | 2.39 | 8.15 | 37.54 | 39.97 | 9.55 | 1.89 | 0.05 |
| 20 | 900 | 14.59 | 25.2 | 34.31 | 18.49 | 5.02 | 1.27 | 1.12 |
| 20 | 1200 | 11.97 | 20.23 | 33.78 | 24.52 | 7.32 | 1.8 | 0.38 |
| 20 | 1450 | 7.87 | 15.46 | 31.13 | 29.18 | 11.44 | 3.89 | 1.03 |
| 30 | 900 | 2.45 | 15.4 | 46.42 | 30.74 | 4.52 | 0.29 | 0.18 |
| 30 | 1200 | 1.61 | 8.19 | 35.57 | 41.67 | 11.28 | 1.53 | 0.15 |
| 30 | 1450 | 1.22 | 7.26 | 30.91 | 44.35 | 13.83 | 2.3 | 0.13 |
| 40 | 900 | 1.74 | 21.38 | 46.6 | 25.875 | 4.04 | 0.34 | 0.1 |
| 40 | 1200 | 0.64 | 11.95 | 44.28 | 36.99 | 5.54 | 0.13 | 0 |
| 40 | 1450 | 0.21 | 7.85 | 36.85 | 40.9 | 11.8 | 2.14 | 0.25 |

Various modifications can be made in the details of the various embodiments of the processes, compositions and articles of the present invention, all within the scope and spirit of the invention and defined by the appended claims.

The invention claimed is:

1. A process for preparing solar reflective roofing granules, the process comprising:
   (a) providing an inorganic binder and inert mineral particles to form a mixture;
   (b) forming the mixture into uncured granulebodies having an exterior surface;
   (c) adhering solar reflective particles only at or proximate to the exterior surface of the uncured granule bodies; and
   (d) firing the binder to provide the solar reflective roofing granules having the solar reflective particles only at or proximate to the exterior surfaces thereof.

2. A process according to claim 1 wherein the solar reflective particles are mechanically adhered to the exterior surface of the uncured granule bodies.

3. A process according to claim 1, further comprising mixing the solar reflective particles with a fluid carrier to form a paste and adhering the solar reflective particles to the exterior surface of the granule bodies by applying the paste to the exterior surface of the granule bodies.

4. A process according to claim 1 further comprising sizing the uncured granules by screening.

5. A process according to claim 1 further comprising surface treating the cured roofing granules.

6. A process according to claim 1 wherein the inert mineral particles comprise uncalcined kaolin, the binder comprises metal silicate, and the binder is cured by heating the uncured granules at from about 500 degrees C. to 800 degrees C.

7. A process for preparing solar reflective roofing granules, the process comprising:
   (a) providing an inorganic binder, ceramic particles and solar reflective particles;
   (b) dispersing the ceramic particles and the solar reflective particles in the inorganic binder to form a mixture;
   (c) forming the mixture into uncured granules, each uncured granule having a plurality of solar reflective particles homogeneously dispersed with a plurality of ceramic particles; and
   (d) firing the uncured granules to form cured roofing granules, each cured roofing granule including a plurality of the solar reflective particles at or proximate to an exterior surface thereof.

8. The process according to claim 7 wherein the ceramic particles have an average particle size of from about 0.1 micrometers to about 40 micrometers.

9. A process according to claim 7 further comprising selecting the solar reflective particles to provide at least 60 percent solar reflectance to the cured roofing granules.

10. A process according to claim 7 further comprising sizing the uncured granules by screening.

11. A process for preparing solar reflective roofing granules, the process comprising:
   (a) providing an inorganic binder and ceramic particles;
   (b) forming the ceramic particles and inorganic binder into uncured granule bodies having an exterior surface;
   (c) adhering solar reflective particles only at or proximate to the exterior surface of the uncured granule bodies; and
   (d) sintering the uncured granule bodies to form solar reflective roofing granules having the solar reflective particles only at or proximate to the exterior surfaces thereof.

12. A process according to claim 11 wherein the solar reflective particles are mechanically adhered to the exterior surface of the uncured granule bodies.

13. A process according to claim 11 further comprising providing a sintering binder and mixing the sintering binder with the ceramic particles to form a mixture and subsequently forming the mixture including the ceramic particles into uncured granule bodies.

* * * * *